(12) United States Patent
Shiraishi

(10) Patent No.: US 8,259,395 B2
(45) Date of Patent: *Sep. 4, 2012

(54) ERECT LIFE-SIZE LENS ARRAY

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 249 days.

This patent is subject to a terminal disclaimer.

(21) Appl. No.: 12/686,067

(22) Filed: Jan. 12, 2010

(65) Prior Publication Data

US 2010/0177401 A1 Jul. 15, 2010

Related U.S. Application Data

(60) Provisional application No. 61/145,074, filed on Jan. 15, 2009.

(51) Int. Cl.
*G02B 27/10* (2006.01)

(52) U.S. Cl. .................................... 359/622; 359/619

(58) Field of Classification Search .................. 359/622
See application file for complete search history.

(56) References Cited

U.S. PATENT DOCUMENTS

2009/0141362 A1* 6/2009 Shimmo et al. ............... 359/622

FOREIGN PATENT DOCUMENTS

| JP | 2005-37891 A | 2/2005 |
| JP | 2006-14081 A | 1/2006 |

* cited by examiner

*Primary Examiner* — James Jones
(74) *Attorney, Agent, or Firm* — Patterson & Sheridan, LLP

(57) ABSTRACT

An erect life-size lens array having a deep focal depth is realized. The erect life-size lens array includes a first lens array, a second lens array and an aperture, and when a thickness of the second lens is $\xi_1$, a refractive index of the second lens is n, a distance between an exit surface of the second lens and a design image surface is $\xi_2$, a radius of a circular hole of the aperture is $r_a$, and a defocus amount is $\xi_3$, the erect life-size lens array is for causing an MTF at a spatial frequency (line-pair/mm) $\nu$ to become $MTF_{target}$ or more, and satisfies $(J_1(2\pi \cdot r_a \cdot ((n/\xi_1)+(1/\xi_2)) \cdot \nu \cdot \xi_3))/(\pi \cdot r_a \cdot ((n/\xi_1)+(1/\xi_2)) \cdot \nu \xi_3) \geq MTF_{target}$, where $J_1$ is a first type first-order Bessel function.

8 Claims, 23 Drawing Sheets

FIG.6

| SRF | RADIUS | THICKNESS | APERTURE RADIUS | GLASS |
|---|---|---|---|---|
| OBJ | 0 | 1 | - | AIR |
| 1 | 0 | 5.55 | - | AIR |
| 2 | 0 | 0 | - | AIR |
| 3 | 0 | 0 | - | AIR |
| 4 | 0 | 0.4 | 0.165 | AIR |
| 5 | 0.711698727 | 2.6 | 0.165 | ARTON |
| 6 | -0.910212969 | 0 | 0.165 | AIR |
| 7 | 0.910212969 | 2.6 | 0.165 | ARTON |
| 8 | 0.711698727 | 5.95 | 0.165 | AIR |
| IMS | 0 | 1 | - | |

FIG.10

| SRF | RADIUS | THICKNESS | APERTURE RADIUS | GLASS |
|---|---|---|---|---|
| OBJ | 0 | 1 | - | AIR |
| 1 | 0 | 5.55 | - | AIR |
| 2 | 0 | 0 | - | AIR |
| 3 | 0 | 0 | - | AIR |
| 4 | 0 | 0.4 | 0.165 | AIR |
| 5 | 1.059394411 | 4.4 | 0.165 | ARTON |
| 6 | -1.54029135 | 0 | 0.165 | AIR |
| 7 | 1.54029135 | 4.4 | 0.165 | ARTON |
| 8 | 1.059394411 | 5.95 | 0.165 | AIR |
| IMS | 0 | 1 | - | |

FIG.14

| SRF | RADIUS | THICKNESS | APERTURE RADIUS | GLASS |
|---|---|---|---|---|
| OBJ | 0 | 1 | - | AIR |
| 1 | 0 | 5.55 | - | AIR |
| 2 | 0 | 0 | - | AIR |
| 3 | 0 | 0 | - | AIR |
| 4 | 0 | 0.4 | 0.0825 | AIR |
| 5 | 0.711698727 | 2.6 | 0.0825 | ARTON |
| 6 | -0.910212969 | 0 | 0.0825 | AIR |
| 7 | 0.910212969 | 2.6 | 0.0825 | ARTON |
| 8 | 0.711698727 | 5.95 | 0.0825 | AIR |
| IMS | 0 | 1 | - | |

ERECT LIFE-SIZE LENS ARRAY

CROSS-REFERENCE TO RELATED APPLICATION

This application is based upon and claims the benefit of priority from: U.S. provisional application 61/145,074, filed on Jan. 15, 2009, the entire contents of which are incorporated herein by reference.

TECHNICAL FIELD

The present invention relates to a technique to realize a long-focal-depth erect life-size lens array.

BACKGROUND

Hitherto, a specific technique to realize a long-focal-depth erect life-size lens array is not disclosed.

JP-A-2006-14081 and JP-A-2005-37891 can be cited as disclosing a technique relating to the long-focal-depth erect life-size lens array.

However, JP-A-2006-14081 merely discloses specifications required for the lens array, and does not disclose a specific technique to realize the long-focal-depth erect life-size lens array.

JP-A-2005-37891 has a problem that the long-focal-depth erect life-size lens array can not be realized.

SUMMARY

In order to solve the problem, according to an aspect of the invention, an erect life-size lens array includes a first lens array in which plural first lenses each having a convex incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, and an aperture which includes plural circular holes corresponding to the plural first lenses and the plural second lenses and is disposed in a vicinity of at least one of the exit surface of the first lens array and the incidence surface of the second lens array between the first lens array and the second lens array, wherein when a thickness of the second lens is $\xi_1$, a refractive index of the second lens is n, a distance between the exit surface of the second lens and a design image surface is $\xi_2$, a radius of the circular hole of the aperture is $r_a$, and a defocus amount is $\xi_3$, the erect life-size lens array is for causing an MTF at a spatial frequency (line-pair/mm) $\nu$ to become $\mathrm{MTF}_{target}$ or more, and satisfies $(J_1(2\pi \cdot r_a \cdot ((n/\xi_1) + (1/\xi_2)) \cdot \nu \cdot \xi_3))/(\pi \cdot r_a \cdot ((n/\xi_1) + (1/\xi_2)) \cdot \nu \cdot \xi_3) \geqq \mathrm{MTF}_{target}$, where $J_1$ is a first type first-order Bessel function.

According to another aspect of the invention, an erect life-size lens array includes a first lens array in which plural first lenses each having a convex incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, and an aperture which includes plural circular holes corresponding to the plural first lenses and the plural second lenses and is disposed in a vicinity of at least one of the exit surface of the first lens array and the incidence surface of the second lens array between the first lens array and the second lens array, wherein when a thickness of the second lens is $\xi_1$, a refractive index of the second lens is n, a distance between the exit surface of the second lens and a design image surface is $\xi_2$, and a radius of the circular hole of the aperture is $r_a$, the erect life-size lens array satisfies $r_a((n/\xi_1)+(1/\xi_2)) \leqq 0.123$.

According to another aspect of the invention, an erect life-size lens array includes a first lens array in which plural first lenses each having a convex incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, and an aperture which includes plural circular holes corresponding to the plural first lenses and the plural second lenses and is disposed in a vicinity of at least one of the exit surface of the first lens array and the incidence surface of the second lens array between the first lens array and the second lens array, wherein when a thickness of the second lens is $\xi_1$, a refractive index of the second lens is n, a distance between the exit surface of the second lens and a design image surface is $\xi_2$, and a radius of the circular hole of the aperture is $r_a$, the erect life-size lens array satisfies $r_a((n/\xi_1)+(1/\xi_2)) \leqq 0.0908$.

According to another aspect of the invention, an erect life-size lens array includes a first lens array in which plural first lenses each having a convex incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, and an aperture which includes plural circular holes corresponding to the plural first lenses and the plural second lenses and is disposed in a vicinity of at least one of the exit surface of the first lens array and the incidence surface of the second lens array between the first lens array and the second lens array, wherein when a thickness of the second lens is $\xi_1$, a refractive index of the second lens is n, a distance between the exit surface of the second lens and a design image surface is $\xi_2$, and a radius of the circular hole of the aperture is $r_a$, the erect life-size lens array satisfies $r_a((n/\xi_1)+(1/\xi_2)) \leqq 0.0604$.

DESCRIPTION OF THE DRAWINGS

FIG. 6 is a view for explaining the basic arrangement of respective lenses in a first example.

FIG. 10 is a view for explaining the basic arrangement of respective lenses in a second example.

FIG. 14 is a view for explaining the basic arrangement of respective lenses in a third example.

DETAILED DESCRIPTION

Hereinafter, an embodiment will be described with reference to the drawings.

Figure 1:
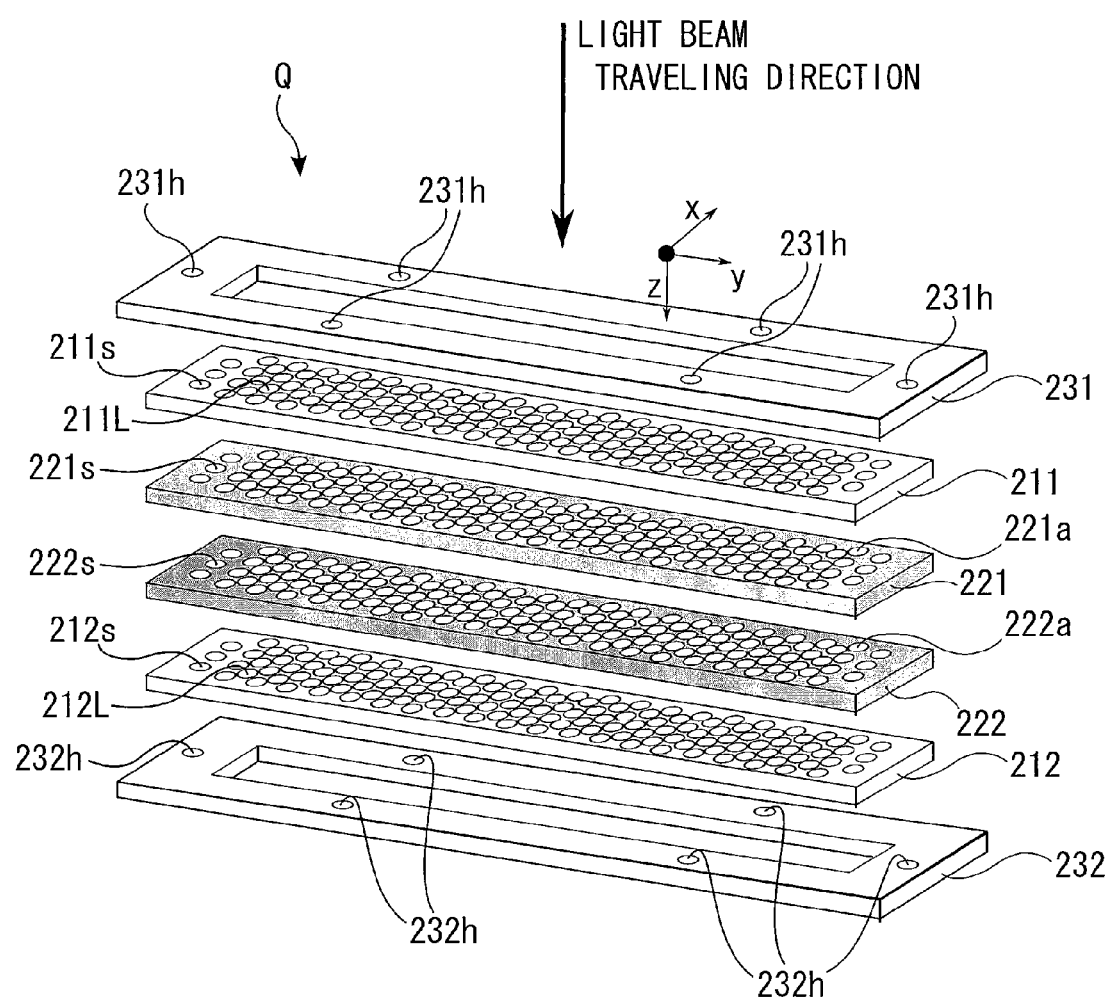
FIG. 1 is an exploded perspective view showing the whole structure of a long-focal-depth erect life-size lens array of an embodiment of the invention.

FIG. 1 is an exploded perspective view showing the whole structure of a long-focal-depth erect life-size lens array Q of the embodiment of the invention. The erect life-size lens array of the embodiment is adopted for, for example, a scanning optical system of a scanner.

As shown in FIG. 1, the erect life-size lens array Q of the embodiment of the invention includes a press plate 231, a first lens array 211, an aperture 221, an aperture 222, a second lens array 212 and a press plate 232. The above respective components constituting the erect life-size lens array Q of the embodiment are arranged in the order of the press plate 231, the first lens array 211, the aperture 221, the aperture 222, the second lens array 212 and the press plate 232 in the traveling direction of a light beam.

The first lens array 211, the aperture 221, the aperture 222 and the second lens array 212 are mutually fixed by bolts or screws inserted in plural screwed holes 231h for positioning and plural holes 232h so as to be sandwiched between the press plate 231 and the press plate 232.

Besides, projections (for example, convex lens shape) 211s and 212s are formed on the surfaces, opposite to the apertures, of the first lens array 211 and the second lens array 212 at positions corresponding to positioning holes 221s and 222s formed on the surfaces, opposite to the respective lens arrays, of the aperture 221 and the aperture 222.

When the first lens array 211, the aperture 221, the aperture 222 and the second lens array 212 are sandwiched between the press plates 231 and 232, they are sandwiched in a state where the projections 211s and 212s on these lens arrays are fitted in the holes 221s and 222s of the respective apertures, so that positioning of the relative positional relation, in the direction orthogonal to the optical axis, of the first lens array 211, the aperture 221, the aperture 222 and the second lens array 212 can be performed. As stated above, the positioning of the lenses and the apertures is realized by the parts having the shapes equivalent to the lenses, so that the parts used for the positioning can be molded simultaneously with the molding of the lens arrays. This can contribute to improvement in relative positioning accuracy of the lenses and the parts used for the positioning, and reduction in manufacture cost.

Incidentally, here, although the structure is illustrated in which the holes are formed on the aperture side and the projections are formed on the lens array side, no limitation is made to this. The projections may be formed on the aperture side, and the holes may be formed on the lens array side. Besides, it is not always necessary that the parts in which the projections are fitted are the holes, and concave parts (for example, concave lens shape) may be adopted.

Specifically, in the first lens array 211 (thickness $\xi_1$ in the z-axis direction in FIG. 1), plural first lenses 211L each having a convex incidence surface and a convex exit surface are arranged in the direction (x-y plane direction in FIG. 1) orthogonal to the optical axis.

In the second lens array 212 (thickness $\xi1$ in the z-axis direction in FIG. 1), plural second lenses 212L each having a convex incidence surface and a convex exit surface are arranged to correspond to the plural first lenses 211L in the direction (x-y plane direction in FIG. 1) orthogonal to the optical axis. Light beams emitted from the exit surfaces of the plural first lenses 211L are incident on the incidence surfaces of the plural second lenses 212L.

The aperture 221 includes plural circular holes 221a corresponding to the plural first lenses 211L, and is disposed in the vicinity of the exit surface of the first lens array 211 between the first lens array 211 and the second lens array 212.

The aperture 222 includes plural circular holes 222a corresponding to the plural second lenses 212L, and is disposed in the vicinity of the incidence surface of the second lens array 212 between the first lens array 211 and the second lens array 212.

By the plural circular holes 221a and 222a, the aperture 221 and the aperture 222 function to prevent that a light beam emitted from the first lens array 211 and incident on the second lens array 212 becomes a stray light, and is not incident on the incidence surface of the lens on which the light beam should be incident, but is incident on adjacent another lens.

Figure 2:
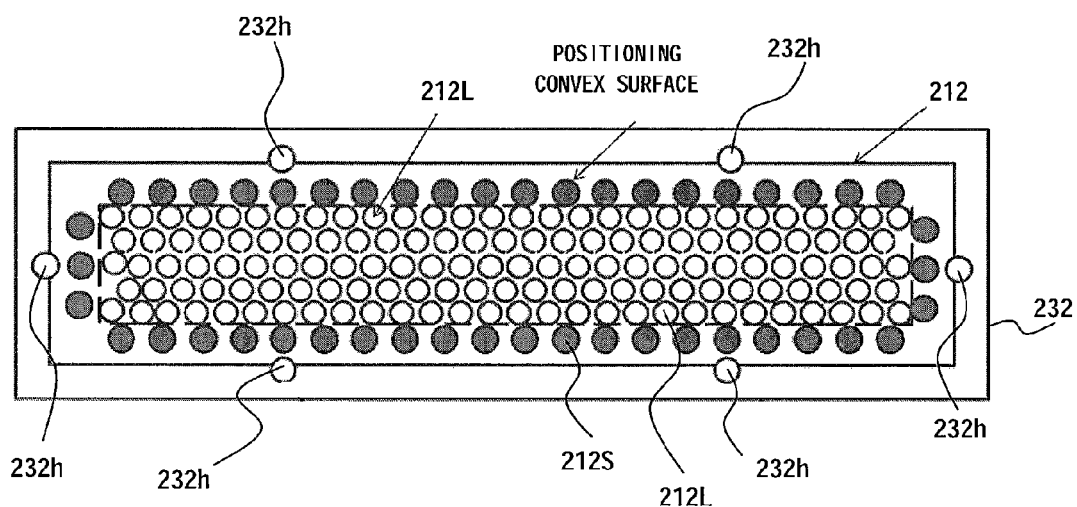
FIG. 2 is a plan view showing a state where a second lens array and a press plate are combined.

FIG. 2 is a plan view showing a state where the second lens array 212 and the press plate 232 are combined.

The incidence surface of the first lens array 211 has such a power that an "object surface" and a "first principal point of a compound lens made of the exit surface of the first lens array 211 and the incidence surface of the second lens array 212" become conjugate to each other.

The exit surface of the first lens array 211 and the incidence surface of the second lens array 212 are two surfaces having such a power that the incidence surface of the first lens array 211 and the exit surface of the second lens array 212 become conjugate to each other.

The exit surface of the second lens array 212 has such a power that a "second principal point of the compound lens made of the exit surface of the first lens array 211 and the incidence surface of the second lens array 212" and an "image surface" become conjugate to each other.

Figure 3:
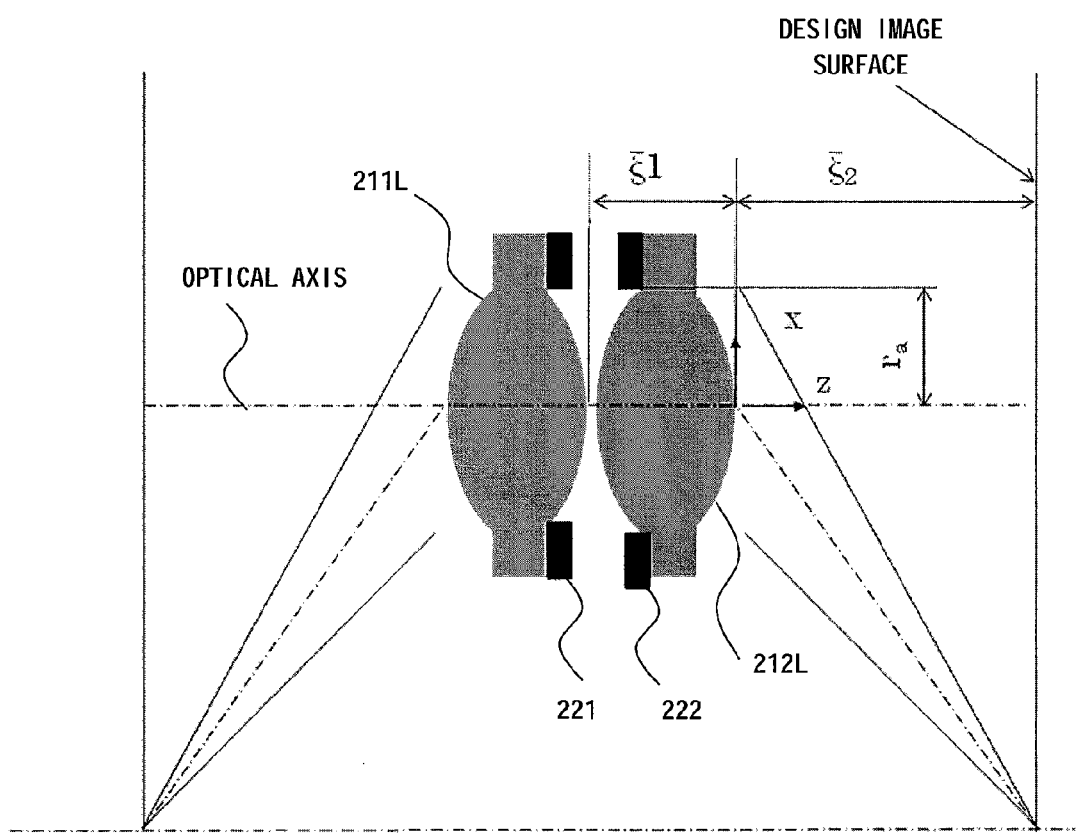
FIG. 3 is a view for explaining a method of deriving a diameter δ of a geometric optical blurred image at the time of defocus in the lens array.
Figure 4:
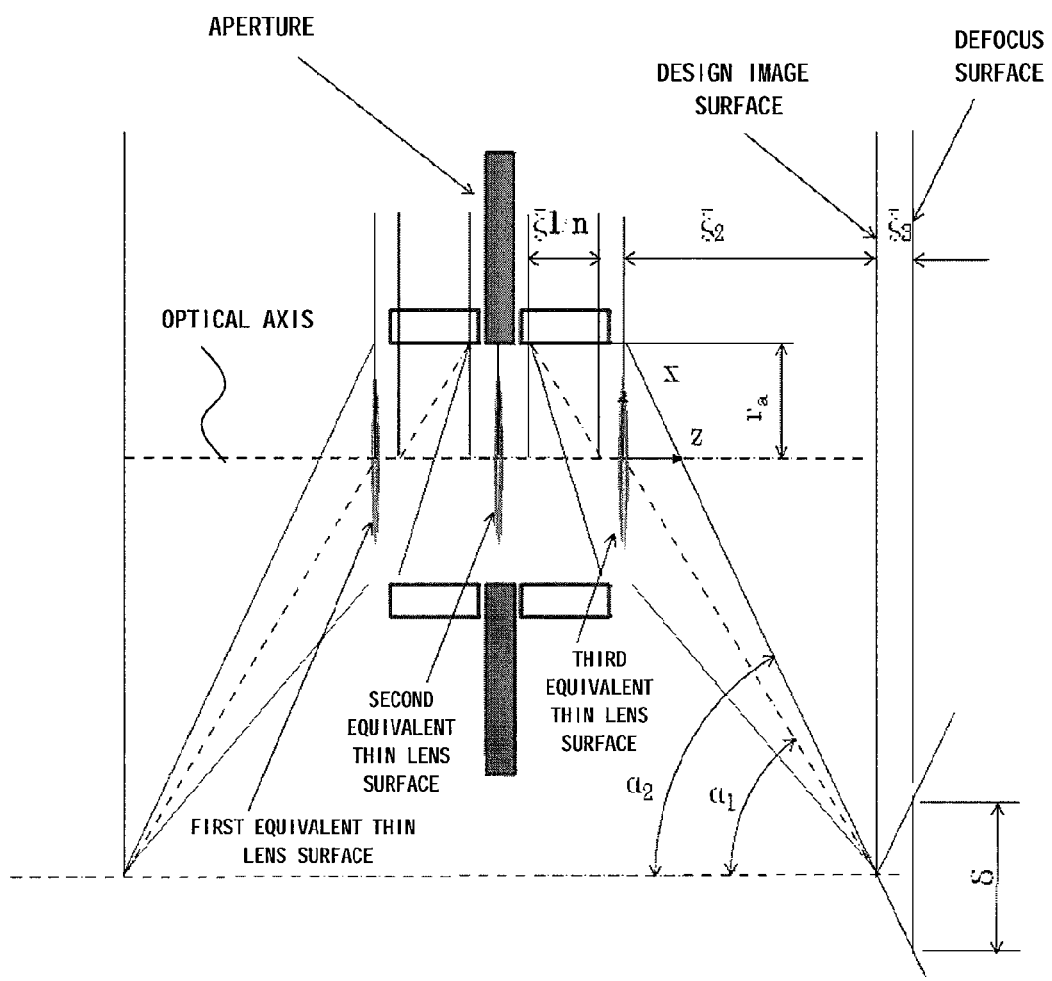
FIG. 4 is a view for explaining the method of deriving the diameter δ of the geometric optical blurred image at the time of defocus in the lens array.

FIG. 3 and FIG. 4 are views for explaining a method of deriving a diameter δ of a geometric optical blurred image at the time of defocus in the lens array. Since the exit surface of the first lens array 211 and the incidence surface of the second lens array 212 are disposed to be sufficiently close to each other, it is possible to approximate that the first principal point of the lens made of the exit surface of the first lens array 211 and the incidence surface of the second lens array 212 is coincident with the second principal point of the lens made of the exit surface of the first lens array 211 and the incidence surface of the second lens array 212.

In this way, the incidence surface of the first lens array 211 can be regarded as a first thin equivalent lens, the exit surface of the first lens array 211 and the incidence surface of the second lens array 212 can be regarded as a second thin equivalent lens, and the exit surface of the second lens array 212 can be regarded as a third thin equivalent lens. The first and the second lens arrays can be regarded as being equivalent to the thin equivalent lenses disposed to be spaced from each other by a distance $\xi_1/n$ (n is a refractive index of the lens).

The distance between the exit surface of the second lens array 212 and the design image surface is $\xi_2$, and the distance between the design image surface and the image surface at the time of defocus is $\xi_3$. When the radius of the aperture is $r_a$, a light beam having the largest angle among light beams passing through the center (principal point) of the third thin equivalent lens is the light passing through the end of the aperture radius in the second thin equivalent lens surface. Since the light beam passes through the principal point, the exit angle is not also changed, and is represented by $$\tan(\alpha_1) = nr_a/\xi_1 \quad (1)$$

Since the outermost light when an image is formed on the image surface is the light beam separated from the principal point by the aperture radius $r_a$, the following expression is established.

$$\tan(\alpha_2) = \tan(\alpha_1) + (r_a/\xi_2) = (nr_a/\xi_1) + (r_a/\xi_2) = r_a((n/\xi_1) + (1/\xi_2)) \quad (2)$$

The diameter δ of the blurred image when the defocus is $\xi_3$ is represented by $$\delta = 2 \times \xi_3 \times \tan(\alpha_2) = 2 \times \xi_3 \times (r_a \times ((n/\xi_1) + (1/\xi_2))) \quad (3)$$

When δ is larger than an airy disk, even if the influence of the diffraction is neglected and geometric-optical consideration is performed, sufficient approximation can be obtained.

When it is assumed that a point image intensity distribution function I(r) is represented by $$I(r) = 1 : 2r \leq \delta \quad (4)$$
$$= 0 : 2r > \delta$$

MTF(ν) (ν is a spatial frequency (lp/mm)) is obtained by performing Fourier transformation of I(r) and is represented by $$MTF(v) = \int I(r)J_0(2\pi \cdot v \cdot r)r \cdot dr \text{(integration range is 0 to } \infty) \quad (5)$$
$$= \int J_0(2\pi \cdot v \cdot r)r \cdot dr \text{(integration range is 0 to } \delta/2)$$
$$= ((2J_1(\pi \cdot \delta \cdot v))/(\pi \cdot \delta \cdot v))$$

Where, $J_1$ is a first type first-order Bessel function. Incidentally, the MTF (modulation transfer function) corresponds to the blur degree of an image or definition.

Thus, when the defocus is $\xi_3$, the MTF is represented by $$MTF(v) = \frac{(2J_1(2\pi \cdot r_a \cdot ((n/\xi_1) + (1/\xi_2)) \cdot v \cdot \xi_3))}{(2\pi \cdot r_a \cdot ((n/\xi_1) + (1/\xi_2)) \cdot v \cdot \xi_3)} \quad (6)$$
$$= \frac{(J_1(2\pi \cdot r_a \cdot ((n/\xi_1) + (1/\xi_2)) \cdot v \cdot \xi_3))}{(\pi \cdot r_a \cdot ((n/\xi_1) + (1/\xi_2)) \cdot v \cdot \xi_3)}$$

Although the MTF when the sensor surface is moved is calculated on the image surface side (CCD side), also when the document surface floats on the object side and defocus occurs, it is conceivable that the same MFT is obtained because of the erect life-size lens array. That is, when the defocus is $\xi_3$, in order to cause the MTF at the spatial frequency (lp/mm) ν to become $MTF_{target}$ or more, it is sufficient if the following expression is satisfied.

$$(J_1(2\pi \cdot r_a \cdot ((n/\xi_1)+(1/\xi_2)) \cdot v \cdot \xi_3))/(\pi \cdot r_a \cdot ((n/\xi_1)+(1/\xi_2)) \cdot v \cdot \xi_3) \geq MTF_{target}$$

Figure 5:
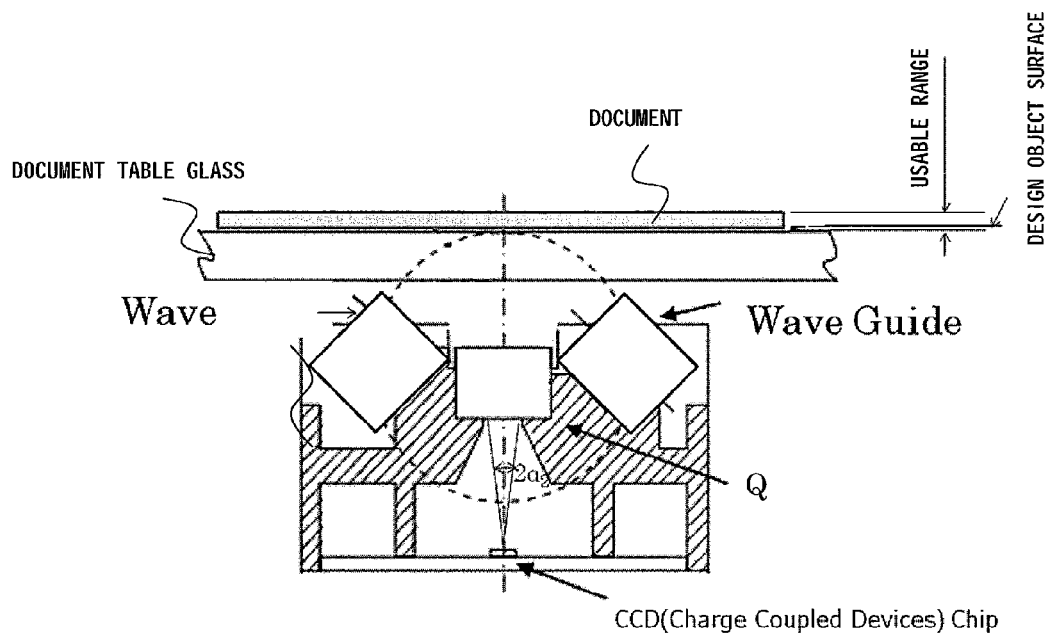
FIG. 5 is a view showing a structure in which the lens array of the invention is mounted in a scanner.

For example, when the erect life-size lens array of the embodiment is used for a scanner, the specifications as the scanner are such that an area where the MTF is 20% or more at spatial frequency of 5 lp (line-pair)/mm is a usable area (see FIG. 5). It is assumed that a state where a document floats from a document surface by 0.1 mm is a standard state, and this case is made the design object surface. It is desirable that the MTF becomes 20% or more on the sensor even if the document floats from the document table glass surface by up to at least 0.55 mm or 0.9 mm if possible. That is, it is desirable that the MTF is 20% or more at 5 lp/mm even when a document is shifted from the design object surface by up to at least 0.45 mm or 0.8 mm if possible.

These conditions are substituted for expression (6), and when the defocus is the minimum of 0.45 mm, a condition under which the MTF becomes 20% or more at 5 lp/mm is represented by $$(J_1(2\pi \cdot r_a \cdot ((n/\xi_1)+(1/\xi_2)) \cdot 5 \cdot 0.45))/(\pi \cdot r_a \cdot ((n/\xi_1)+(1/\xi_2)) \cdot 5 \cdot 0.45) \geq 0.2 \quad (7)$$

When expression (7) is solved, the condition is represented by $$r_a \cdot ((n/\xi_1)+(1/\xi_2)) \leq 0.218 \quad (8)$$

A more desirable condition under which the defocus is 0.8 mm and the MTF is 20% or more at 5 lp/mm is represented by $$(J_1(2\pi \cdot r_a \cdot ((n/\xi_1)+(1/\xi_2)) \cdot 5 \cdot 0.8))/(\pi \cdot r_a \cdot ((n/\xi_1)+(1/\xi_2)) \cdot 5 \cdot 0.8) \geq 0.2 \quad (9)$$

When expression (9) is solved, the condition is represented by $$r_a \cdot ((n/\xi_1)+(1/\xi_2)) \leq 0.123 \quad (10)$$

Incidentally, when regulation is performed within the range where the MTF is 10% or more at spatial frequency of 6 lp/mm as disclosed in JP-A-2006-14081, in order to realize the focal depth of 1 mm, the following relation has to be established.

$$(J_1(2\pi \cdot r_a \cdot ((n/\xi_1)+(1/\xi_2)) \cdot 6 \cdot 1))/(\pi \cdot r_a \cdot ((n/\xi_1)+(1/\xi_2)) \cdot 6 \cdot 1) \geq 0.1 \quad (11)$$

When expression (11) is solved, the following relation is obtained.

$$r_a \cdot ((n/\xi_1)+(1/\xi_2)) \leq 0.0908 \quad (12)$$

When the document floating amount is 1.6 mm as disclosed in JP-A-2006-14081 and the design image surface is separated from the document table glass surface by 0.1 mm in accordance with the invention, and when the focal depth is defined by MTF(6)>0.1 (10%), the defocus area of 1.5 mm from the design object surface is used, and the following expression is obtained.

$$(J_1(2\pi \cdot r_a \cdot ((n/\xi_1)+(1/\xi_2)) \cdot 6 \cdot 1.5))/(\pi \cdot r_a \cdot ((n/\xi_1)+(1/\xi_2)) \cdot 6 \cdot 1.5) \leq 0.1 \quad (13)$$

When expression (13) is solved, the following relation is obtained.

$$r_a \cdot ((n/\xi_1)+(1/\xi_2)) \leq 0.0604 \quad (14)$$

Hereinafter, as specific design examples, a first to a third examples will be described.

The lenses are arranged in hexagonal close packing as shown in FIG. 2, a distance between lens centers is P, and an aperture radius is $r_a$. Incidentally, the reason why the lens group constituting the respective lens arrays are arranged in hexagonal close packing is to maximize the effective lens area per unit area.

First Example

A first example will be first described.

It is assumed that P=0.4 mm and $r_a$=0.165 mm are established. FIG. 6 shows the basic arrangement of respective lenses in the first example.

Figure 7:
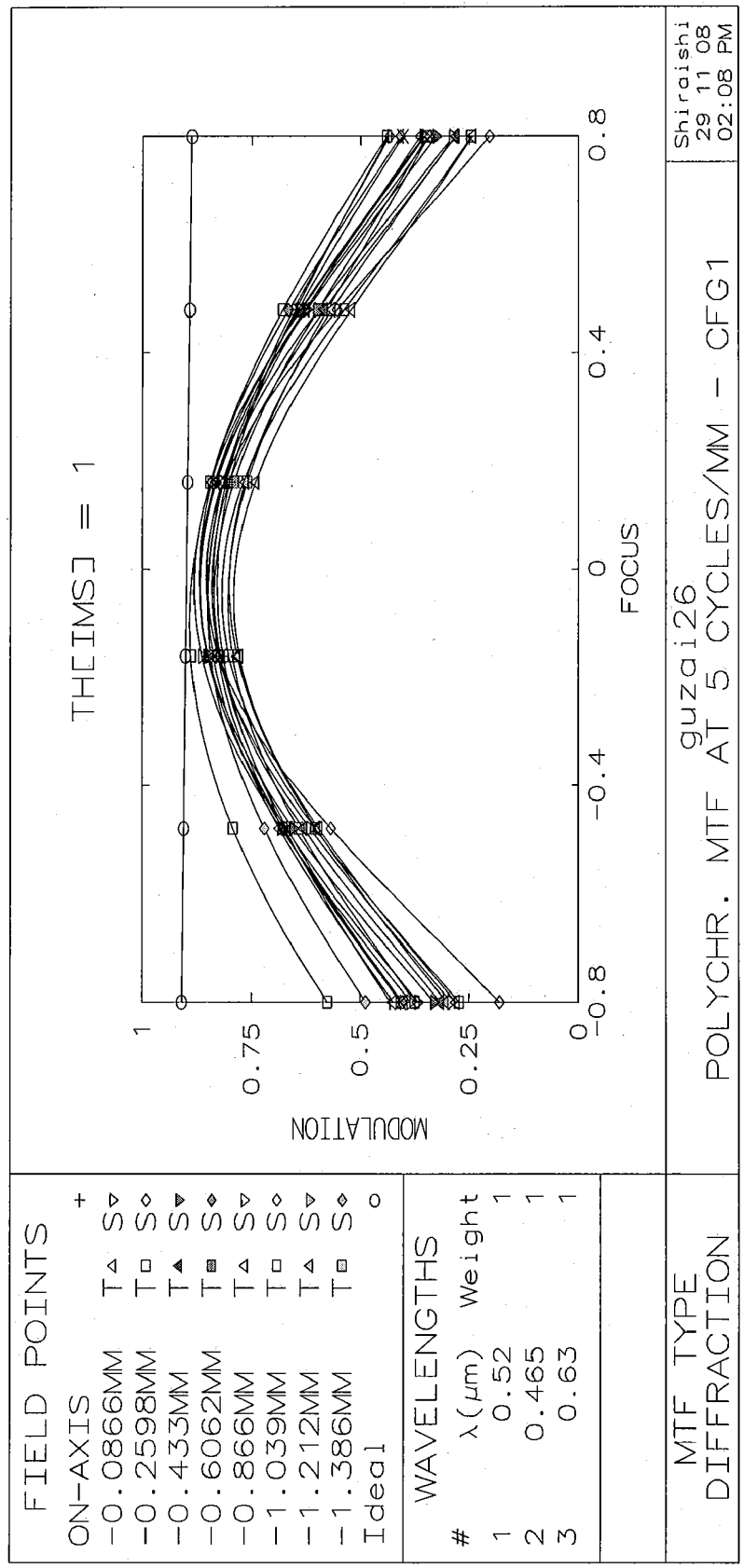
FIG. 7 is a plotted view in which the horizontal axis of a lens array of the first example represents a defocus amount, and the vertical axis represents MTF(5) which is the MTF at 5 cycles/mm.
Figure 8:
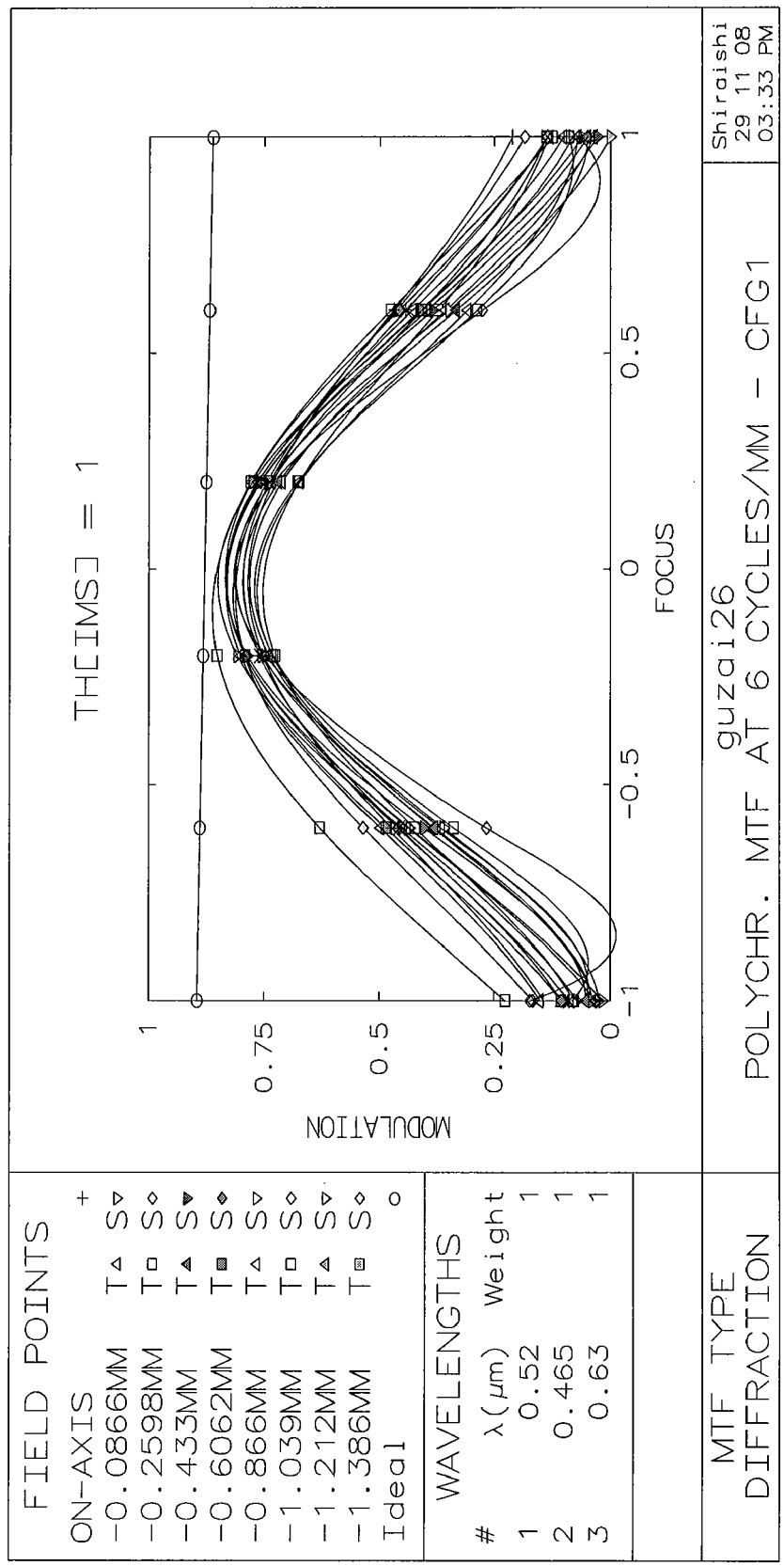
FIG. 8 is a view showing a state where the value of MTF (6) is lower than 0.1 (10%) at the defocus ±1 or more.

At this time, since $\xi_1$=2.6 and $\xi_2$=6.95 are established, $$r_a((n/\xi_1)+(1/\xi_2))=0.119339248 \leq 0.123 \leq 0.218$$

is established and satisfies expression (8) and expression (10). FIG. 7 is a plotted view in which the horizontal axis of the lens array of the first example represents a defocus amount, and the vertical axis represents MTF(5) which is the MTF at 5 cycles/mm. It is understood that the MTF(5) exceeds 0.2 (20%) at the time of defocus of both 0.45 and 0.8. However, since expression (12) and expression (14) are not satisfied, as shown in FIG. 8, the value of MTF(6) is lower than 0.1 (10%) at the defocus ±1 or more.

Figure 9:
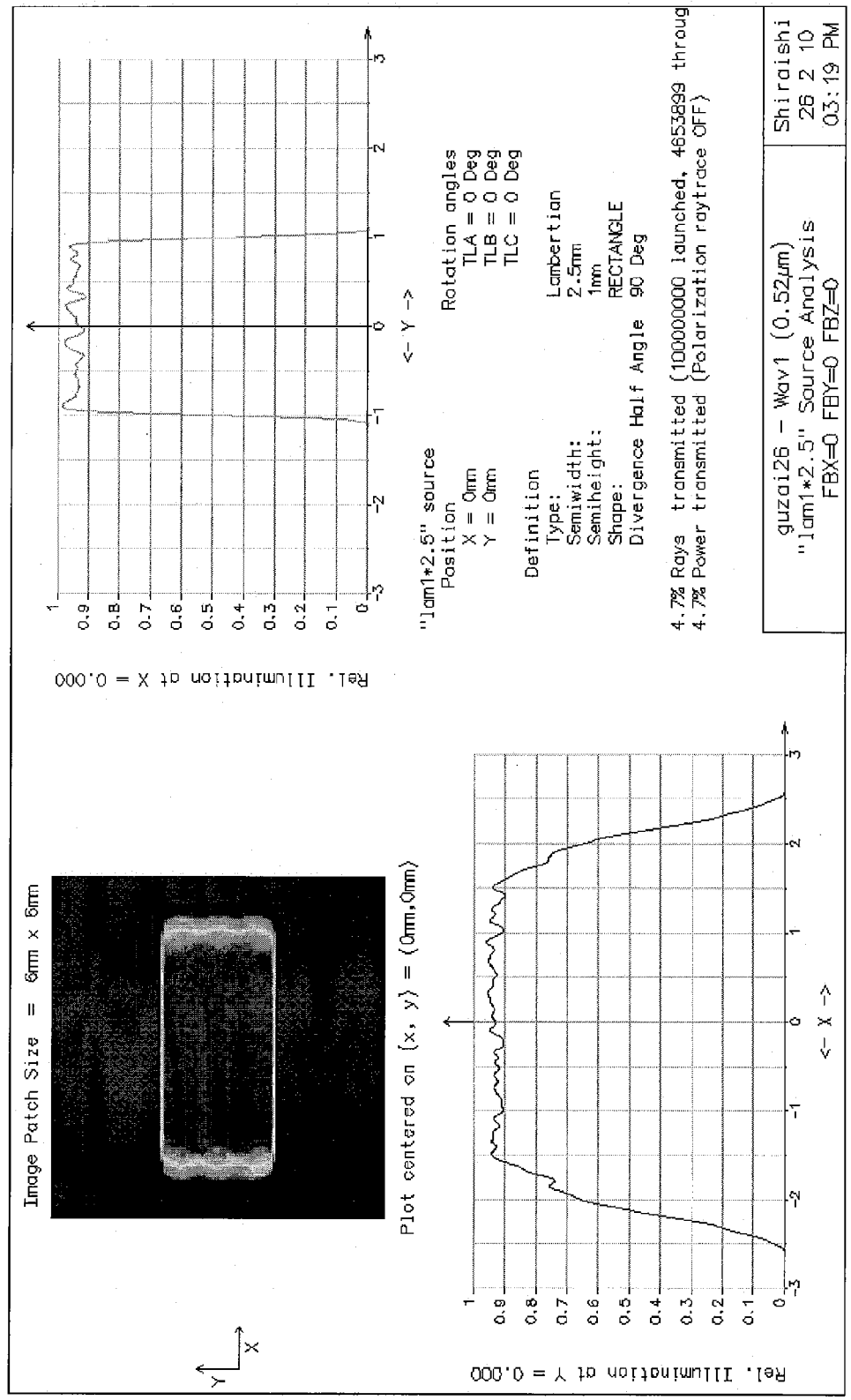
FIG. 9 is a view showing an illumination distribution in the first example.

FIG. 9 shows an illumination distribution in the structure of the first example. An upper right drawing shows the illumination distribution in a sub-scanning direction (direction of document scan), and a lower left drawing shows the illumination distribution in a main scanning direction. As shown in FIG. 9, it is understood that according to the structure of the first example, there is no large change in light amount.

Second Example

Next, a second example will be described.

It is assumed that P=0.4 mm and $r_a$=0.165 mm are established, and FIG. 10 shows the basic arrangement of respective lenses in the second example.

At this time, since $\xi_1$=4.4 and $\xi_2$=6.95 are established, $$r_a((n/\xi_1)+(1/\xi_2))=0.080230877 \leq 0.0908 \leq 0.123 \leq 0.218$$

is established and satisfies expression (8), expression (10) and expression (12).

Figure 11:
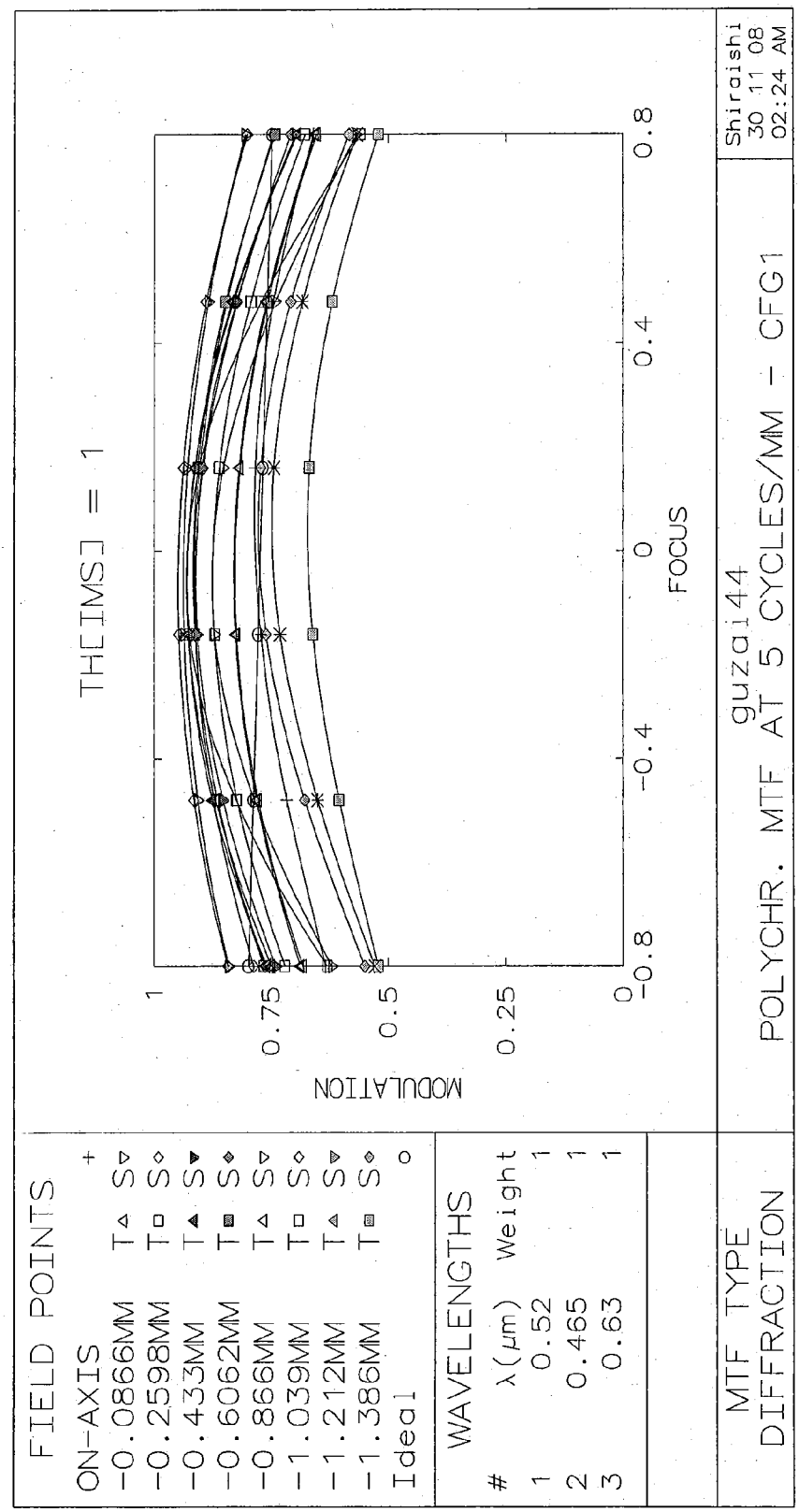
FIG. 11 is a plotted view in which the horizontal axis of a lens array of the second example represents a defocus amount, and the vertical axis represents MTF(5) which is the MTF at 5 cycles/mm.
Figure 12:
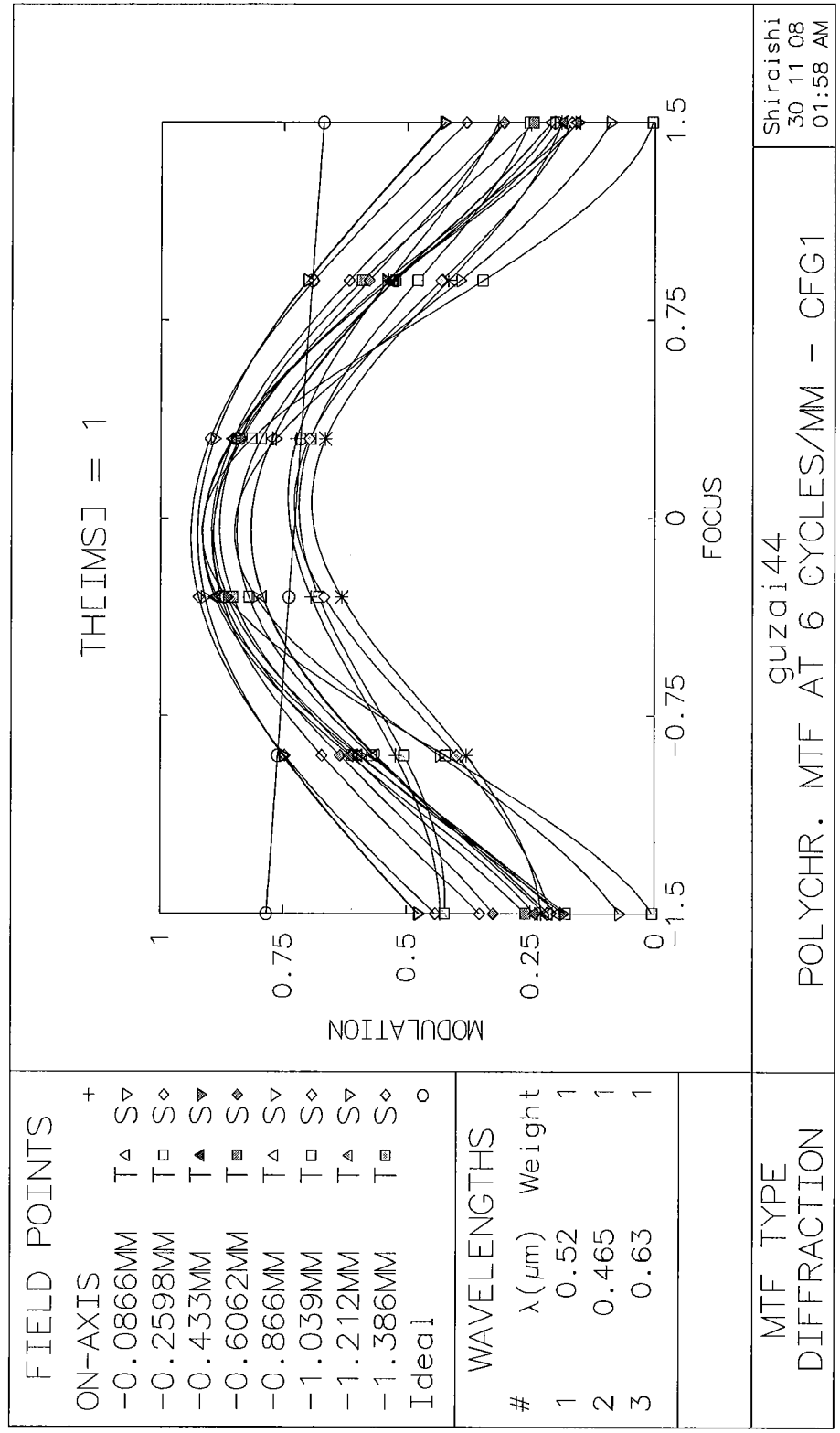
FIG. 12 is a view showing a state where the value of MTF (6) exceeds 0.1 (10%) at the defocus ±1 and is lower than 0.1 (10%) at ±1.5 or more.

FIG. 11 is a plotted view in which the horizontal axis of the lens array of the second example represents a defocus amount, and the vertical axis represents MTF(5) which is the MTF at 5 cycles/mm. It is understood that the MTF(5) exceeds 0.2 (20%) at the time of defocus of both 0.45 and 0.8. However, since expression (14) is not satisfied while expression (12) is satisfied, as shown in FIG. 12, the value of MTF (6) exceeds 0.1 (10%) at the defocus ±1 and is lower than 0.1 (10%) at the defocus ±1.5 or more.

Figure 13:
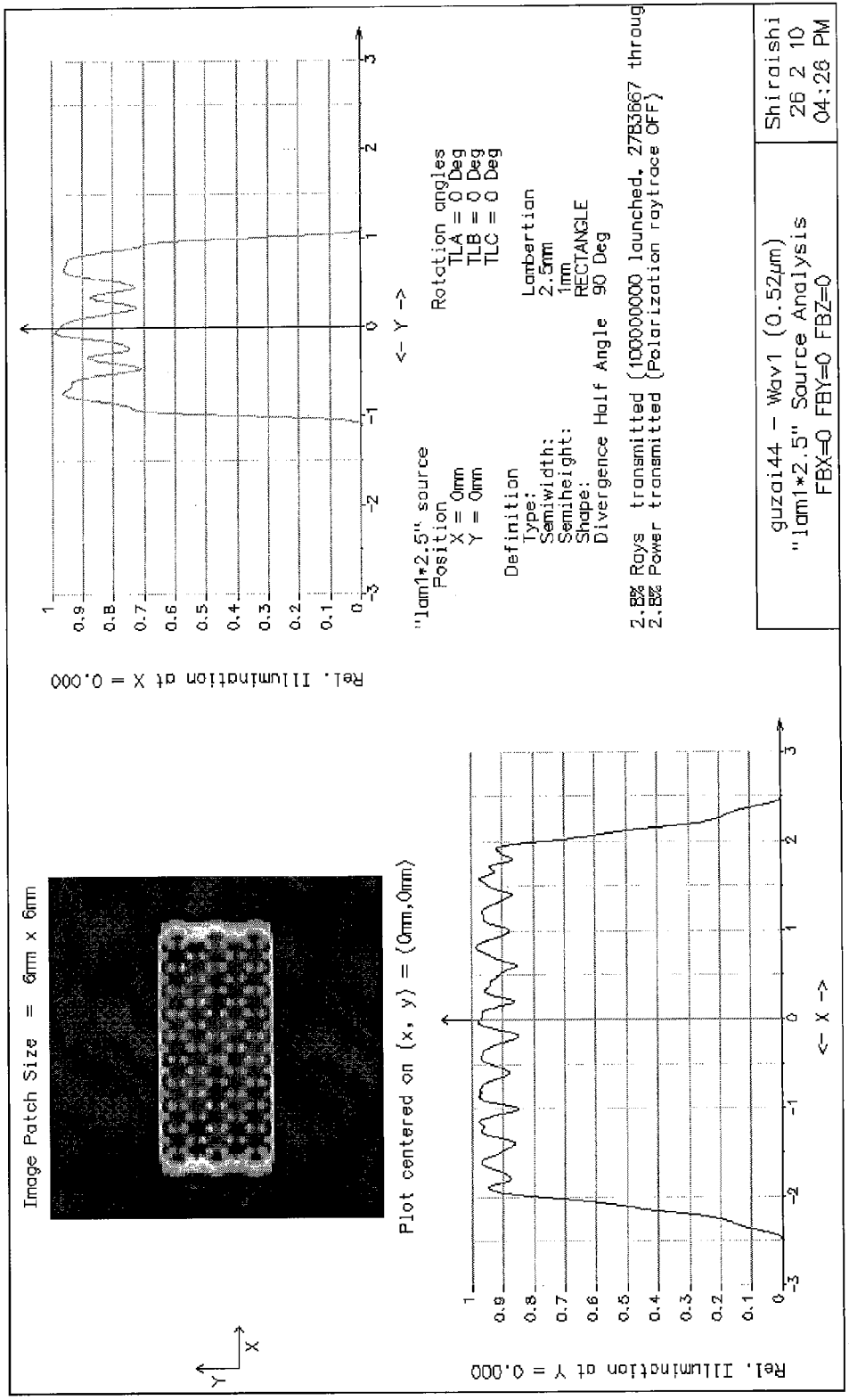
FIG. 13 is a view showing an illumination distribution in the structure of the second example.

FIG. 13 shows an illumination distribution in the structure of the second example. An upper right drawing shows the illumination distribution in a sub-scanning direction (direction of document scan), and a lower left drawing shows the illumination distribution in a main scanning direction. Although a change in light amount is large, since it does not exceed 20%, it is within the range of shading correction.

Third Example

It is assumed that P=0.2 mm and $r_a$=0.0825 mm are established, and FIG. 14 shows the basic arrangement of respective lenses in the third example. As is understood from the comparison with FIG. 6, only the pitch and aperture radius are different from those of the first example, and other values are the same.

Figure 15:
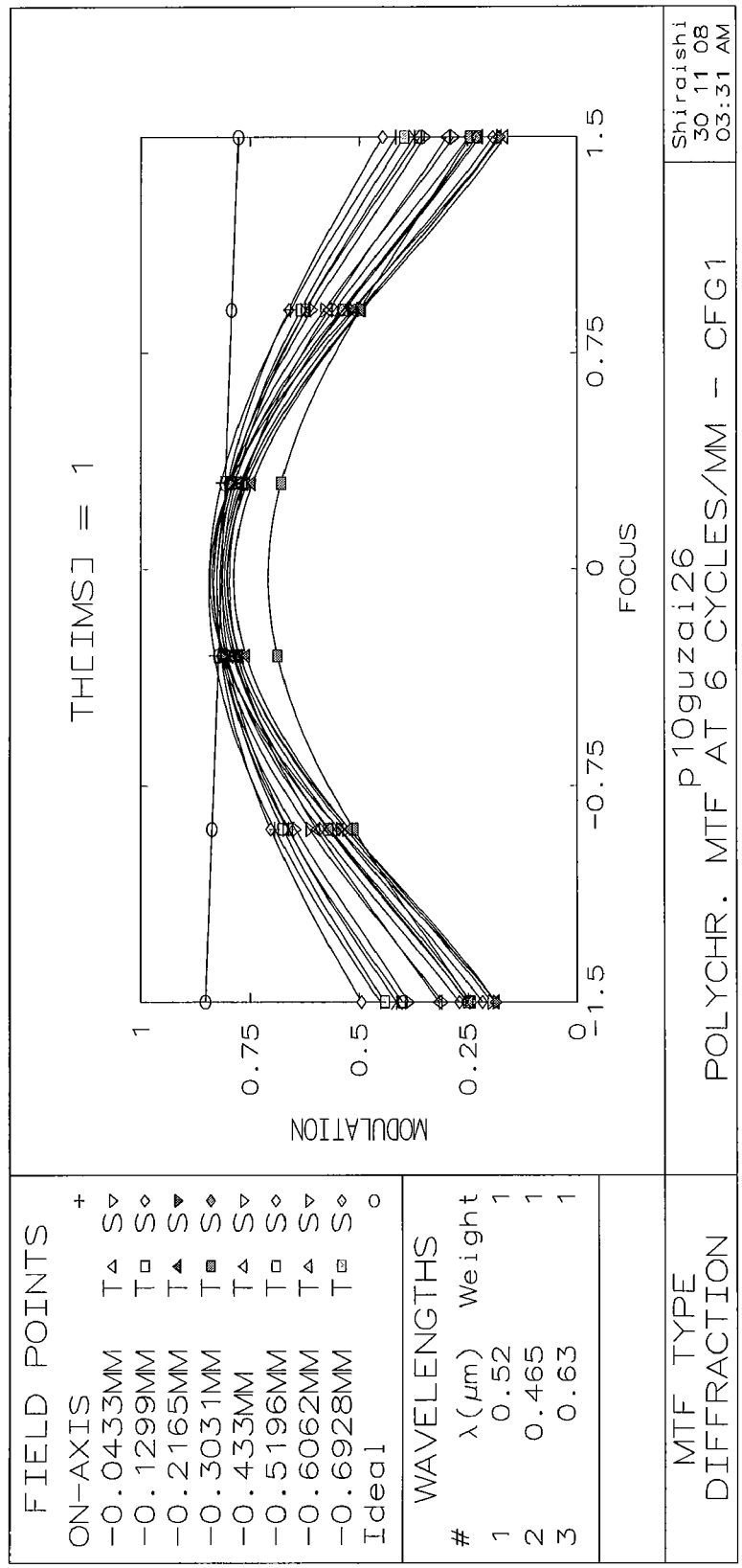
FIG. 15 is a plotted view in which the horizontal axis of a lens array of the third example represents a defocus amount, and the vertical axis represents MTF(6) which is the MTF at 6 cycles/mm.

At this time, since $\xi_1$=2.6 and $\xi_2$=6.95 are established, $$r_a((n/\xi_1)+(1/\xi_2))=0.059669624 \leq 0.0604 \leq 0.0908 \leq 0.123 \leq 0.218$$

is established, and satisfies expression (8), expression (10), expression (12) and expression (14). FIG. 15 is a plotted view in which the horizontal axis of the lens array of the third example represents a defocus amount, and the vertical axis represents MTF(6) which is the MTF at 6 cycles/mm. It is understood that the MTF(6) exceeds 0.1 (10%) at the time of defocus of both 1 and 1.5.

Figure 16:
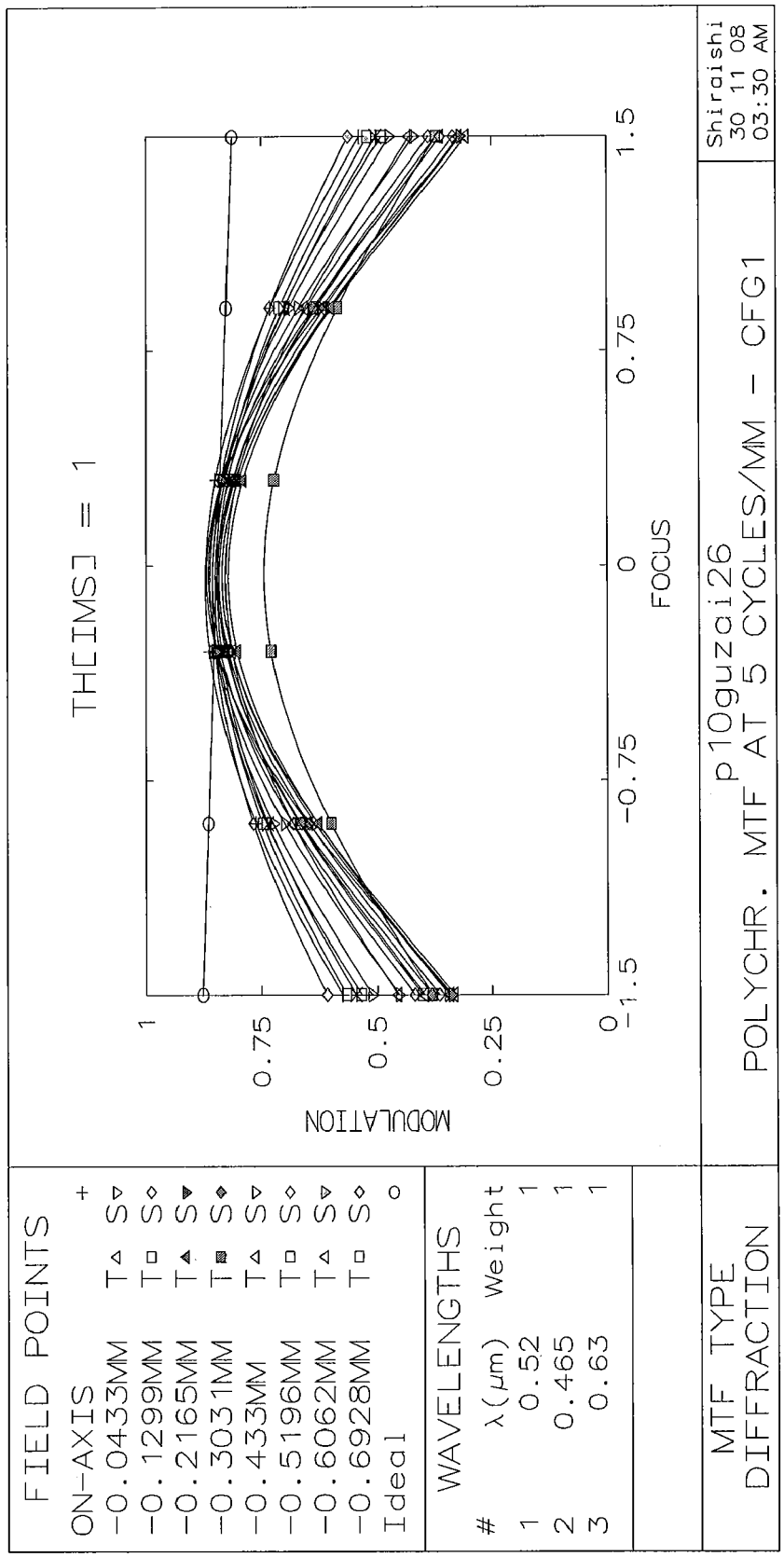
FIG. 16 is a plotted view in which the horizontal axis of the lens array of the third example represents a defocus amount, and the vertical axis represents MTF(5) which is the MTF at 5 cycles/mm.

FIG. 16 is a plotted view in which the horizontal axis of the lens array of the third example represents a defocus amount, and the vertical axis represents MTF(5) which is the MTF at 5 cycles/mm. It is understood that the MTF(5) exceeds 0.2 (20%) at the time of defocus of both 0.45 and 0.8.

Figure 17:
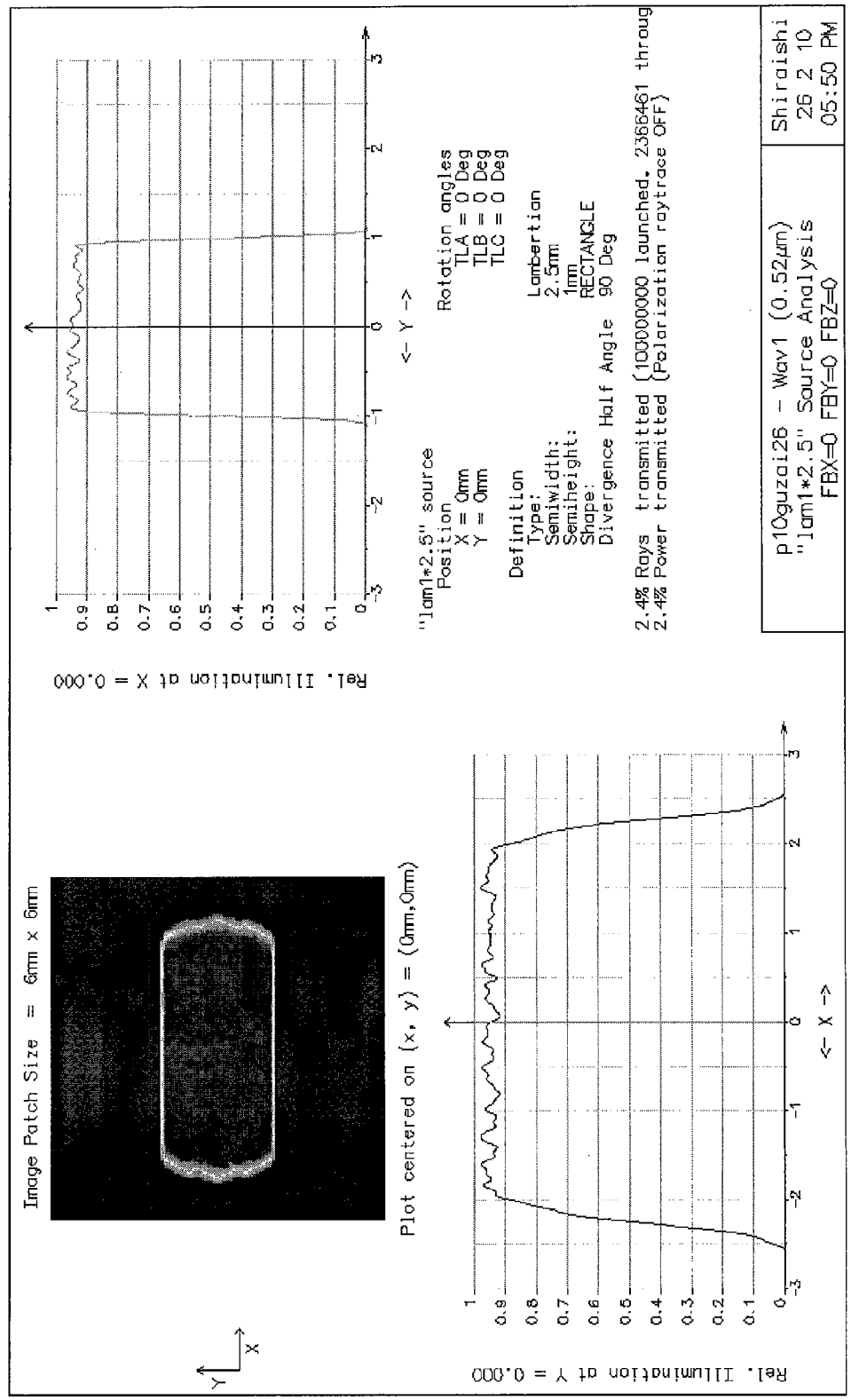
FIG. 17 is a view showing an illumination distribution in the structure of the third example.

FIG. 17 shows an illumination distribution in the structure of the third example. An upper right drawing shows the illumination distribution in a sub-scanning direction (direction of document scan), and a lower left drawing shows the illumination distribution in a main scanning direction. As shown in FIG. 17, according to the structure of the third example, it is understood that there is no large change in light amount.

Modified Example 1

Figure 18:
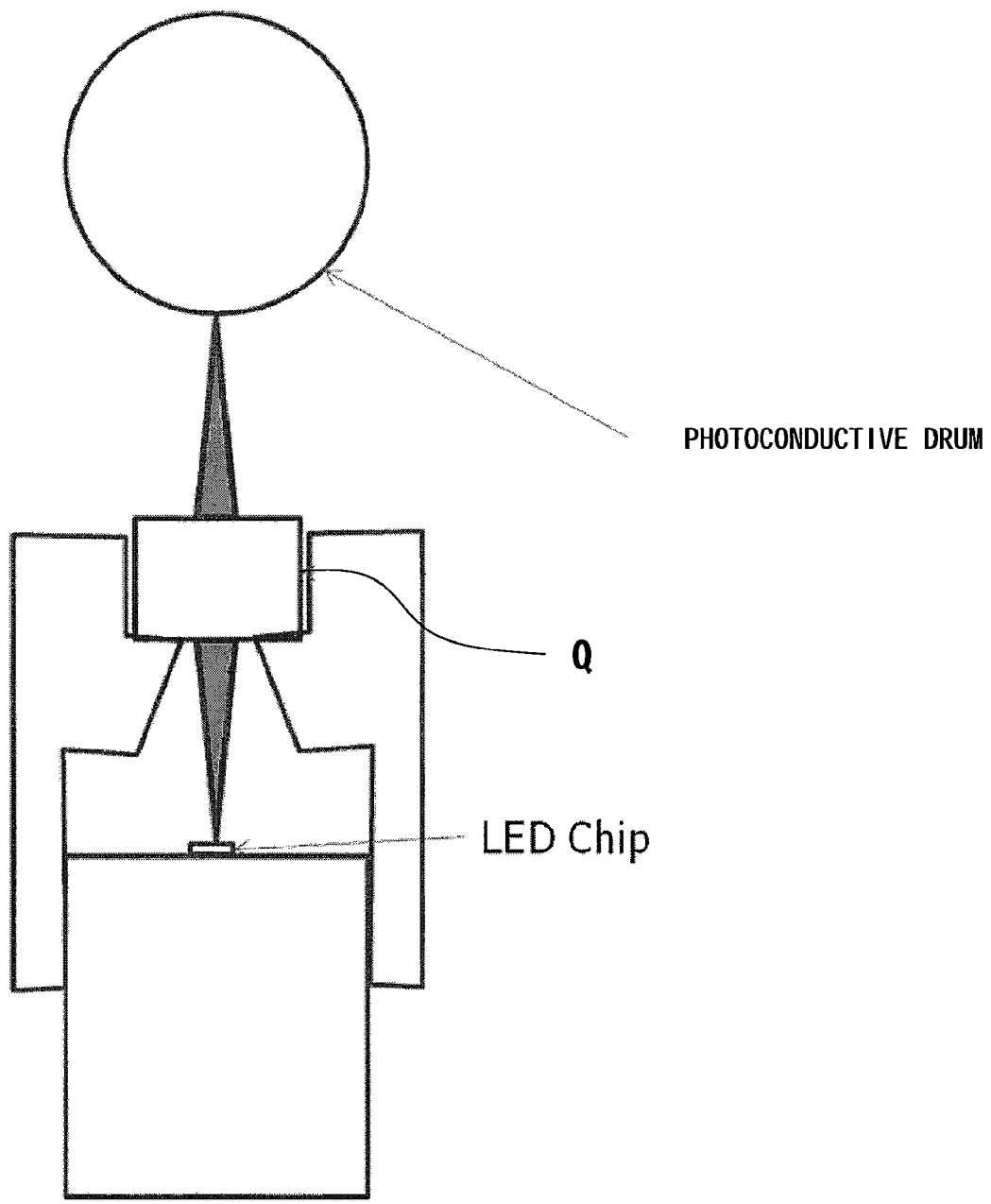
FIG. 18 is a view showing a state where an erect life-size lens array is adopted in a writing optical system.

In the foregoing respective examples, although the depth of focal depth is considered about the erect life-size lens array used for the reading optical system, the erect life-size lens array Q can also be used for a writing optical system as shown in FIG. 18.

When the erect life-size lens array Q having the foregoing structure is adopted for the writing optical system in an image forming apparatus, the writing optical system can be realized which is not easily influenced by variation in diameter of a photoconductive drum, eccentricity of the photoconductive drum, attachment accuracy of the photoconductive drum and the like.

Incidentally, in the foregoing examples, although the structure is illustrated in which the first and the second apertures are disposed between the first lens array and the second lens array, no limitation is made to this. For example, a structure can also be adopted in which one aperture is disposed in the vicinity of the exit surface of the first lens array between the first lens array and the second lens array, or one aperture is disposed in the vicinity of the incidence surface of the second lens array between the first lens array and the second lens array.

Hereinafter, different points between the present invention and the technique disclosed in JP-A-2006-14081 will be described in detail.

JP-A-2006-14081 states on paragraph [0014] that "The erect life-size image-formation system is constructed by overlapping, for example, two or three lens plates vertically, and the center of a minute lens of the upper lens plate is coincident with the center of a minute lens of the lower lens plate. Besides, when the single lens angular aperture of the lens plate is made 4 to 11°, both the transmission light amount and the focal depth can be satisfied. Preferably, the angular aperture is 4 to 6.8°".

In general, the "angular aperture" means, in optical design, an angle from an object point on an optical axis of an optical system to a diameter of entrance pupil, or an angle from an image point on an optical axis to a diameter of exit pupil (see Optical Technical Term Dictionary http://www.optronics.co.jp/lex/detail.php?id=1225).

Figure 19:
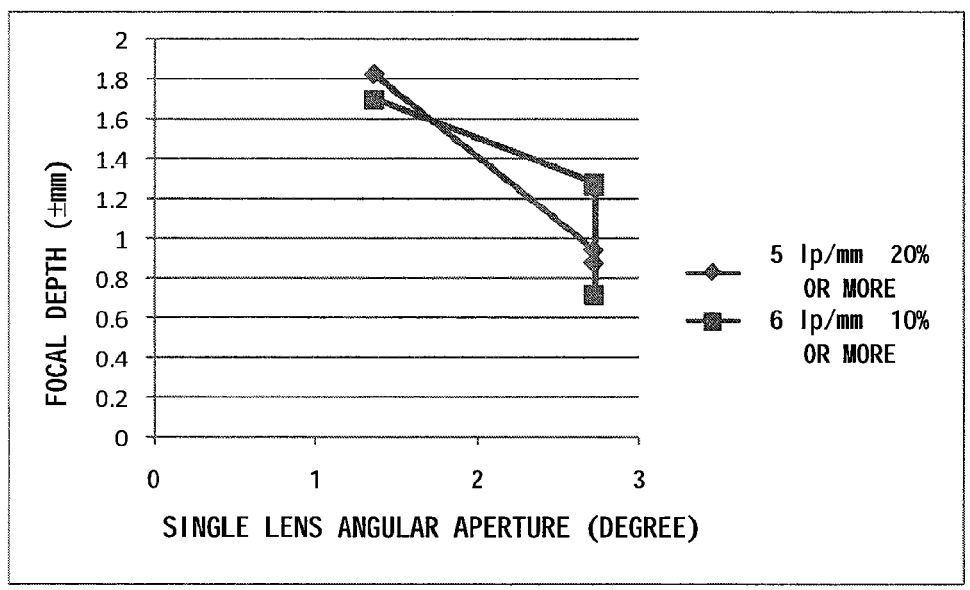
FIG. 19 is a plotted view in which the horizontal axis represents a single lens angular aperture, and the vertical axis represents a focal depth.

However, as shown in FIG. 19, in the embodiment of the invention, when a horizontal axis represents a single lens angular aperture and a vertical axis represents a focal depth and plotting is performed, it is understood that there is no relation like monotone decreasing.

Figure 20:
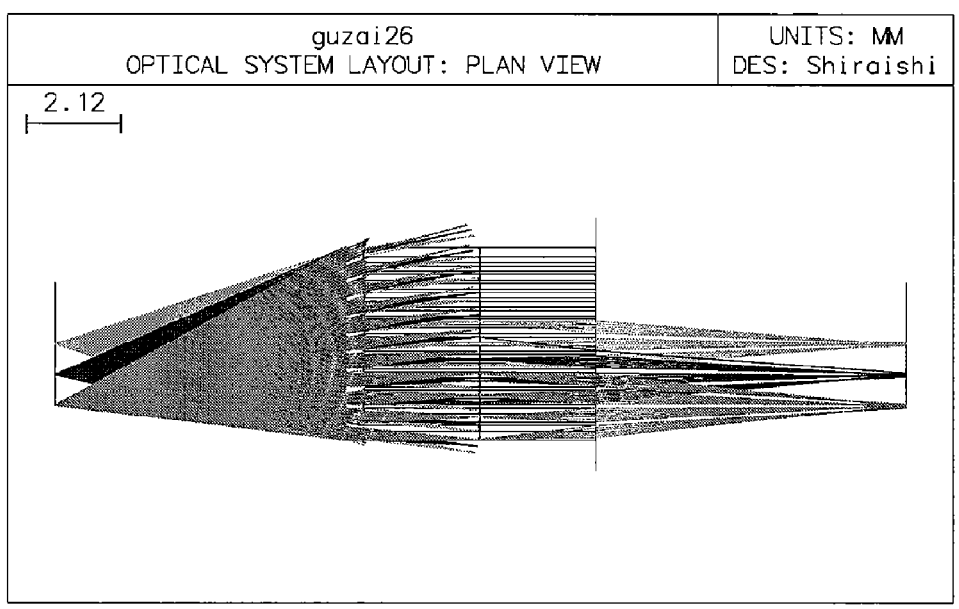
FIG. 20 is a view showing a state where light passing through two or more sets of array forms an image on an image surface.
Figure 21:
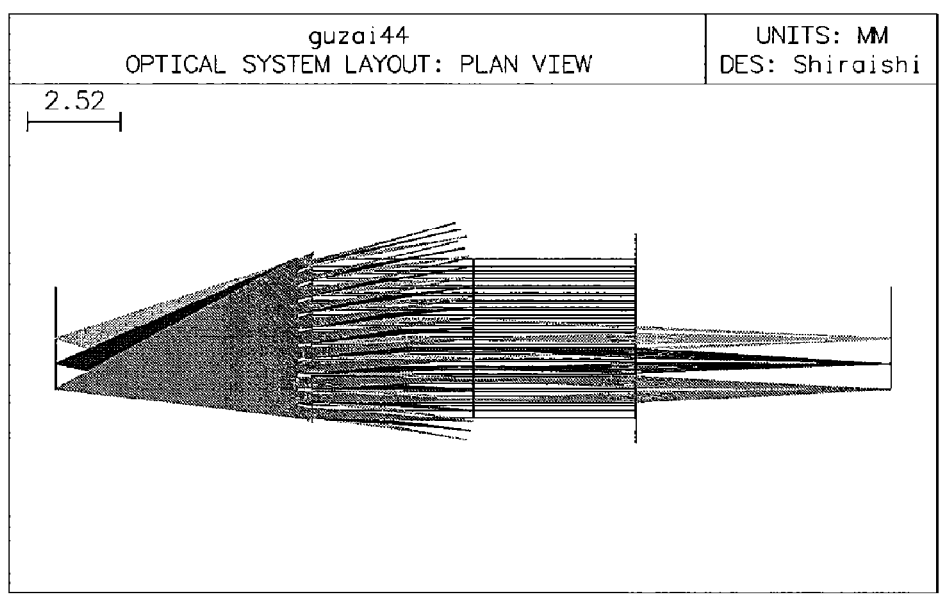
FIG. 21 is a view showing a state where light passing through two or more sets of array forms an image on an image surface.
Figure 22:
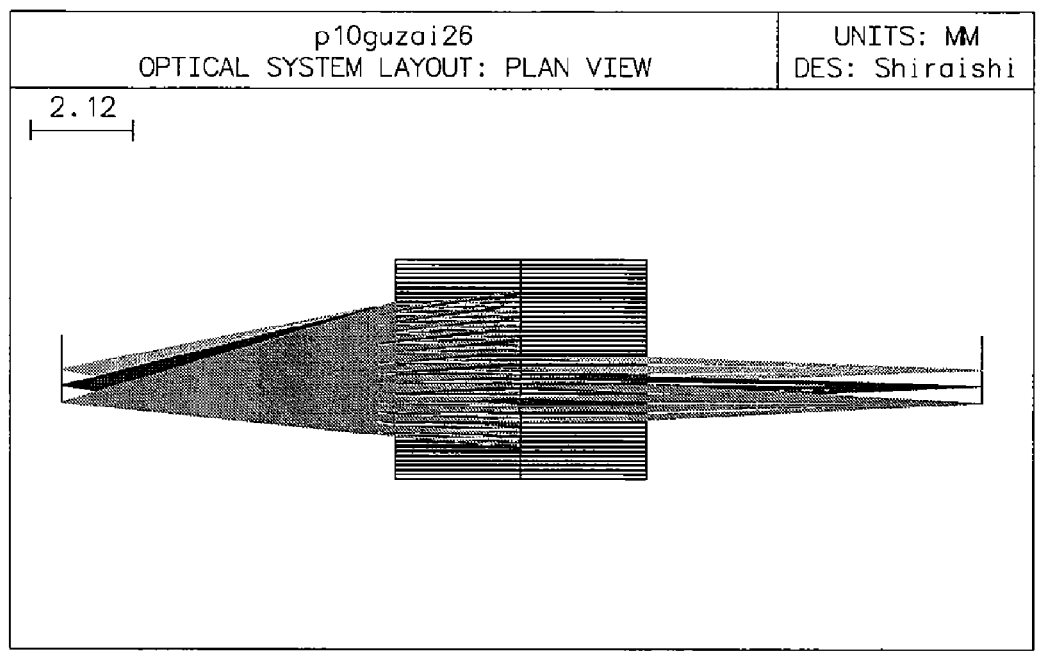
FIG. 22 is a view showing a state where light passing through two or more sets of array forms an image on an image surface.

Besides, JP-A-2006-14081 discloses that it is desirable that the single lens angular aperture is 4 to 11°. However, in this embodiment, the single lens angular aperture is 3° or less in all the three examples. With respect to the single lens angular aperture which is disclosed to be desirable in JP-A-2006-14081, the desirable focal depth is not obtained according to other parameters, and the desirable focal depth can be obtained also by another single lens angular aperture. The focal depth is determined by the single lens angular aperture only when a case where a light beam passes through one set of array is dominant. In that case, in order to uniform the light amount between the case where the light beam passes through one set of array and the case where the light beam passes through two sets of array, it is necessary to strictly match the aperture radii and positions. When the light beam is made to pass through at least two sets of array, even if the aperture radii and positions are slightly shifted, an increase in light amount unevenness can be reduced. In this embodiment, in all the three examples, as shown in FIG. 20 to FIG. 22, light passing through at least two sets of array forms an image on the image surface.

Figure 23:
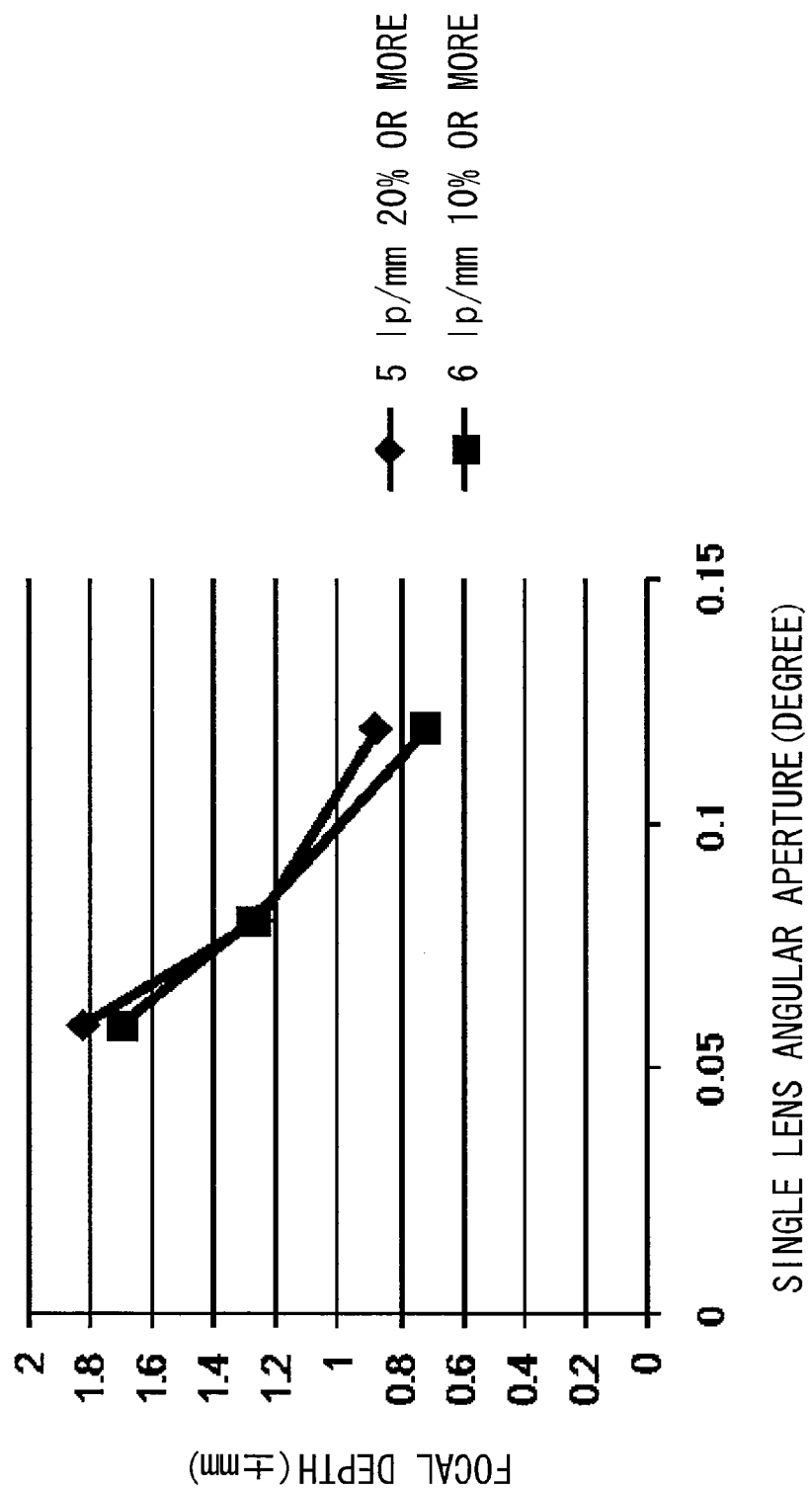
FIG. 23 is a view showing that a focal depth is in a monotone decreasing relation to $r_a \cdot ((n/\xi_1)+(1/\xi_2))$.

When FIG. 23 is seen, it is understood that the focal depth is in relation of monotone decreasing to the parameter $$r_a \cdot ((n/\xi_1) + (1/\xi_2)).$$

The present invention can be carried out in various forms without departing from the sprit or the gist thereof. Thus, the foregoing embodiments are merely exemplary in every point and should not be interpreted restrictively. The scope of the present invention is represented by the claims and is not restricted by the description of the present specification. Further, all modifications, various improvements, alternatives and reformations belonging to the equivalent scope of the claims are within the scope of the invention.

As described above, according to the embodiment of the invention, the erect life-size lens array having a deep focal depth can be realized.

What is claimed is:

1. An erect life-size lens array comprising:
a first lens array in which plural first lenses each having a convex incidence surface and a convex exit surface are arranged in a direction orthogonal to an optical axis;
a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident; and
an aperture which includes plural circular holes corresponding to the plural first lenses and the plural second lenses and is disposed in a vicinity of at least one of the exit surface of the first lens array and the incidence surface of the second lens array between the first lens array and the second lens array,
wherein when a thickness of the second lens is $\xi_1$, a refractive index of the second lens is n, a distance between the exit surface of the second lens and a design image surface is $\xi_2$, a radius of the circular hole of the aperture is $r_a$, and a defocus amount is $\xi_3$, the erect life-size lens array is for causing an MTF at a spatial frequency (line-pair/mm) v to become $MTF_{target}$ or more, and satisfies $(J_1(2\pi \cdot r_a \cdot ((n/\xi_1)+(1/\xi_2)) \cdot v \cdot \xi_3))/(\pi \cdot r_a \cdot ((n/\xi_1)+(1/\xi_2)) \cdot v \cdot \xi_3) \geq MTF_{target}$, where $J_1$ is a first type first-order Bessel function.

2. The lens array of claim 1, wherein
the incidence surface of the first lens has a power to cause an object surface and a first principal point of a compound lens made of the exit surface of the first lens and the incidence surface of the second lens to become conjugate to each other, and
the exit surface of the second lens has a power to cause a second principal point of the compound lens made of the exit surface of the first lens and the incidence surface of the second lens and an image surface to become conjugate to each other.

3. An erect life-size lens array comprising:
a first lens array in which plural first lenses each having a convex incidence surface and a convex exit surface are arranged in a direction orthogonal to an optical axis;
a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident; and
an aperture which includes plural circular holes corresponding to the plural first lenses and the plural second lenses and is disposed in a vicinity of at least one of the exit surface of the first lens array and the incidence surface of the second lens array between the first lens array and the second lens array,
wherein when a thickness of the second lens is $\xi_1$, a refractive index of the second lens is n, a distance between the exit surface of the second lens and a design image surface is $\xi_2$, and a radius of the circular hole of the aperture is $r_a$, the erect life-size lens array satisfies $r_a((n/\xi_1)+(1/\xi_2)) \leq 0.123$.

4. The lens array of claim 3, wherein
the incidence surface of the first lens has a power to cause an object surface and a first principal point of a compound lens made of the exit surface of the first lens and the incidence surface of the second lens to become conjugate to each other, and the exit surface of the second lens has a power to cause a second principal point of the compound lens made of the exit surface of the first lens and the incidence surface of the second lens and an image surface to become conjugate to each other.

5. An erect life-size lens array comprising:

a first lens array in which plural first lenses each having a convex incidence surface and a convex exit surface are arranged in a direction orthogonal to an optical axis;

a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident; and an aperture which includes plural circular holes corresponding to the plural first lenses and the plural second lenses and is disposed in a vicinity of at least one of the exit surface of the first lens array and the incidence surface of the second lens array between the first lens array and the second lens array, wherein when a thickness of the second lens is $\xi_1$, a refractive index of the second lens is n, a distance between the exit surface of the second lens and a design image surface is $\xi_2$, and a radius of the circular hole of the aperture is $r_a$, the erect life-size lens array satisfies $r_a((n/\xi_1)+(1/\xi_2)) \leq 0.0908$.

6. The lens array of claim 5, wherein the incidence surface of the first lens has a power to cause an object surface and a first principal point of a compound lens made of the exit surface of the first lens and the incidence surface of the second lens to become conjugate to each other, and the exit surface of the second lens has a power to cause a second principal point of the compound lens made of the exit surface of the first lens and the incidence surface of the second lens and an image surface to become conjugate to each other.

7. An erect life-size lens array comprising:

a first lens array in which plural first lenses each having a convex incidence surface and a convex exit surface are arranged in a direction orthogonal to an optical axis;

a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident; and an aperture which includes plural circular holes corresponding to the plural first lenses and the plural second lenses and is disposed in a vicinity of at least one of the exit surface of the first lens array and the incidence surface of the second lens array between the first lens array and the second lens array, wherein when a thickness of the second lens is $\xi_1$, a refractive index of the second lens is n, a distance between the exit surface of the second lens and a design image surface is $\xi_2$, and a radius of the circular hole of the aperture is $r_a$, the erect life-size lens array satisfies $r_a((n/\xi_1)+(1/\xi_2)) \leq 0.0604$.

8. The lens array of claim 7, wherein the incidence surface of the first lens has a power to cause an object surface and a first principal point of a compound lens made of the exit surface of the first lens and the incidence surface of the second lens to become conjugate to each other, and the exit surface of the second lens has a power to cause a second principal point of the compound lens made of the exit surface of the first lens and the incidence surface of the second lens and an image surface to become conjugate to each other.

* * * * *